US011926164B2

(12) United States Patent
Hamano

(10) Patent No.: US 11,926,164 B2
(45) Date of Patent: Mar. 12, 2024

(54) RECORDING APPARATUS AND RECORDING HEAD

(71) Applicant: CANON KABUSHIKI KAISHA, Tokyo (JP)

(72) Inventor: Tetsu Hamano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 112 days.

(21) Appl. No.: 17/825,582

(22) Filed: May 26, 2022

(65) Prior Publication Data

US 2022/0379626 A1 Dec. 1, 2022

(30) Foreign Application Priority Data

May 31, 2021 (JP) ................................ 2021-091749

(51) Int. Cl.
*B41J 2/175* (2006.01)
*B41J 2/18* (2006.01)

(52) U.S. Cl.
CPC ....... *B41J 2/17596* (2013.01); *B41J 2/17513* (2013.01); *B41J 2/18* (2013.01); *B41J 2202/12* (2013.01)

(58) Field of Classification Search
CPC ........ B41J 29/13; B41J 2/17513; B41J 2/175; B41J 2/18; B41J 2/17509; B41J 2/17596; B41J 2/17553; B41J 2202/12
See application file for complete search history.

(56) References Cited

U.S. PATENT DOCUMENTS 7,445,325 B2 * 11/2008 Aikawa .................. B41J 2/1752 347/100
7,686,438 B2 * 3/2010 Ogawa ................. B41J 2/17513 347/86
9,139,012 B2 * 9/2015 Yamada .............. B41J 2/17506

FOREIGN PATENT DOCUMENTS

JP 2017-081075 A 5/2017

* cited by examiner

*Primary Examiner* — An H Do
(74) *Attorney, Agent, or Firm* — Canon U.S.A., Inc. I.P. Division

(57) ABSTRACT

A recording apparatus includes a recording head configured to discharge a liquid, a first liquid reservoir unit configured to store the liquid to be supplied to the recording head, a liquid supply port configured to supply the liquid stored in the first liquid reservoir unit into the recording head, a liquid supply path connecting the first liquid reservoir unit and the liquid supply port, a second reservoir unit, in the recording head, configured to store the liquid supplied from the liquid supply port, and a holding unit configured to hold the liquid supplied from the second reservoir unit, in the recording head, wherein the second reservoir unit includes an opening provided upward in a direction of a gravitational force with respect to the liquid supply port and is configured to supply the liquid to the holding unit, when the recording head is in a posture of performing recording.

16 Claims, 11 Drawing Sheets

RECORDING APPARATUS AND RECORDING HEAD

BACKGROUND

Field of the Disclosure

The present disclosure relates to a recording apparatus that records an image, and a recording head.

Description of the Related Art

There is known an inkjet printer (inkjet recording apparatus) that includes an ink tank capable of storing ink to be supplied to a recording head, which discharges the ink. The ink is supplied from the ink tank to the recording head via an ink supply path. Japanese Patent Application Laid-Open No. 2017-81075 discusses a recording head that internally has an air layer between a liquid supply unit that is a path capable of distributing a liquid and a holding member that holds the liquid.

However, according to the configuration discussed in Japanese Patent Application Laid-Open No. 2017-81075, if the air in the air layer within the recording head expands due to a temperature change or an atmospheric pressure change, the surface of a liquid at an outlet of a supply port may move backward to let the air into the liquid flow path. Thus, cleaning or ink suction is sometimes necessary to expel the air from the liquid flow path.

SUMMARY

Aspects of the present disclosure provide a recording apparatus that, if the air in a recording head expands due to a temperature change or an atmospheric pressure change, suppresses the air from entering into a supply path.

According to an aspect of the present disclosure, a recording apparatus includes a recording head configured to discharge a liquid and record an image, a first liquid reservoir unit configured to store the liquid to be supplied to the recording head, a liquid supply port configured to supply the liquid stored in the first liquid reservoir unit into the recording head, a liquid supply path connecting the first liquid reservoir unit and the liquid supply port, a second reservoir unit, disposed in the recording head, configured to reserve the liquid supplied from the liquid supply port, and a holding unit configured to hold the liquid supplied from the second reservoir unit, in the recording head, wherein the second reservoir unit includes an opening that is provided upward in a direction of a gravitational force with respect to the liquid supply port and is configured to supply the liquid to the holding unit, in a case where the recording head is in a posture of performing recording.

Further features of the present disclosure will become apparent from the following description of exemplary embodiments with reference to the attached drawings.

DESCRIPTION OF THE EMBODIMENTS

Figure 1:
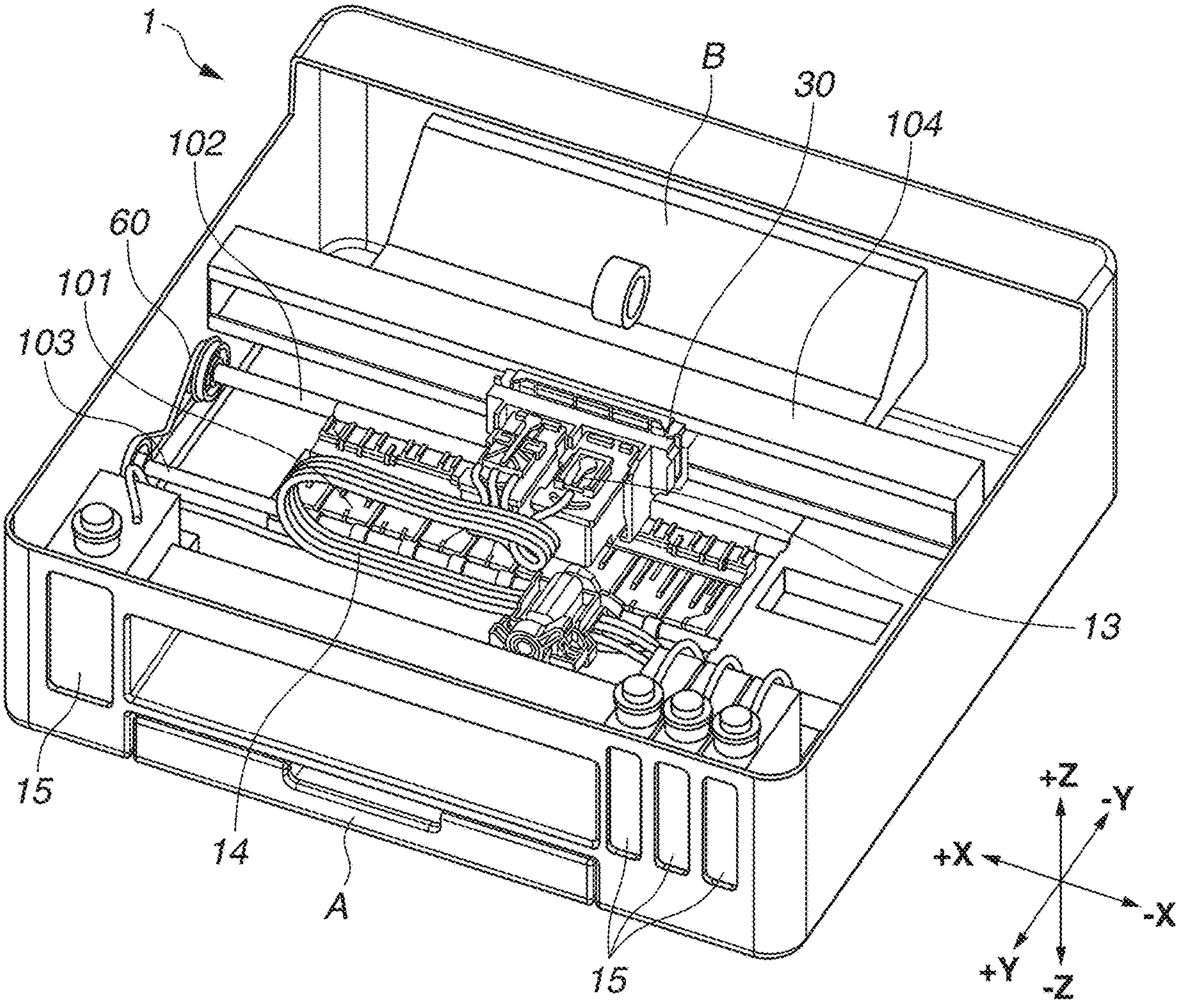
FIG. 1 is an outline view of an inkjet recording apparatus in an exemplary embodiment of the present disclosure.

First, an outline of an inkjet recording apparatus according to the present disclosure will be described. FIG. 1 is an outline view of an inkjet recording apparatus in a first exemplary embodiment of the present disclosure. An inkjet recording apparatus 1 (hereinafter, recording apparatus 1) feeds, by a paper feed roller not illustrated, a recording medium stacked in a paper feed cassette A at a front side of the recording apparatus 1 or in a paper feed tray B at a rear side of the recording apparatus 1. Then, the recording medium is nipped between a conveyance roller 102 and a following pinch roller not illustrated and conveyed by rotation of the conveyance roller 102 in a +Y direction illustrated in the drawing while being guided to and supported on a platen 101. The conveyance roller 102 is a metallic roller that is processed by forming fine asperities on its surface to generate a large friction force. The pinch roller is elastically biased to the conveyance roller 102 by a pressing unit such as a spring not illustrated.

The platen 101 is arranged at a position facing a recording head 13. The platen 101 supports a back side of the recording medium to maintain a constant or predetermined distance between an ink discharge portion 81 (see FIG. 6) of the recording head 13 and a front side of the recording medium facing the ink discharge portion 81. After completion of recording by the recording head 13 on the recording medium conveyed to the platen 101, the recording medium is nipped between an ejection roller 103 and a spur roller that is a rotational body following the ejection roller 103, and ejected to an outside of the recording apparatus 1.

The ejection roller 103 is a rubber roller having a large friction coefficient. The spur roller is elastically biased to the ejection roller 103 by a pressing unit such as a spring not illustrated.

The recording head 13 is mounted on a bottom of a carriage 30 to face the conveyed recording medium, and has the ink discharge portion 81 that discharges ink for each ink color. The carriage 30 is driven to reciprocate by a driving unit such as a motor in an X direction (main scanning direction) along a guide rail 104, which is arranged above and below. The X direction refers to a direction orthogonal to a conveyance direction (Y direction) of the recording medium on a horizontal plane.

The recording head 13 discharges ink droplets while moving together with the carriage 30 in the main scanning direction to record an image of one band on the recording medium on the platen 101. Once an image of one band is recorded, the recording medium is conveyed in a predetermined amount by the conveyance roller in the conveyance direction (intermittent conveyance operation). By repeating this one-band recording operation and the intermittent conveyance operation, a full image based on image data is recorded on the recording medium.

A plurality of independent ink tanks 15 is fixed to an apparatus body, as first liquid reservoir units corresponding to the colors of ink discharged from the recording head 13. The ink tanks 15 and the recording head 13 are connected via joints not illustrated by ink supply paths 14, which are liquid supply paths corresponding to the colors of ink. This allows the color ink stored in the ink tanks 15 to be individually supplied to the ink discharge portions 81 of the recording head 13 corresponding to the ink colors. In addition, a maintenance unit 40 described below (see FIG. 3) is arranged to face the ink discharge portions 81 of the recording head 13 in a range of reciprocation by the recording head 13 and in an area outside an area through which the conveyed recording medium passes.

Figure 2:
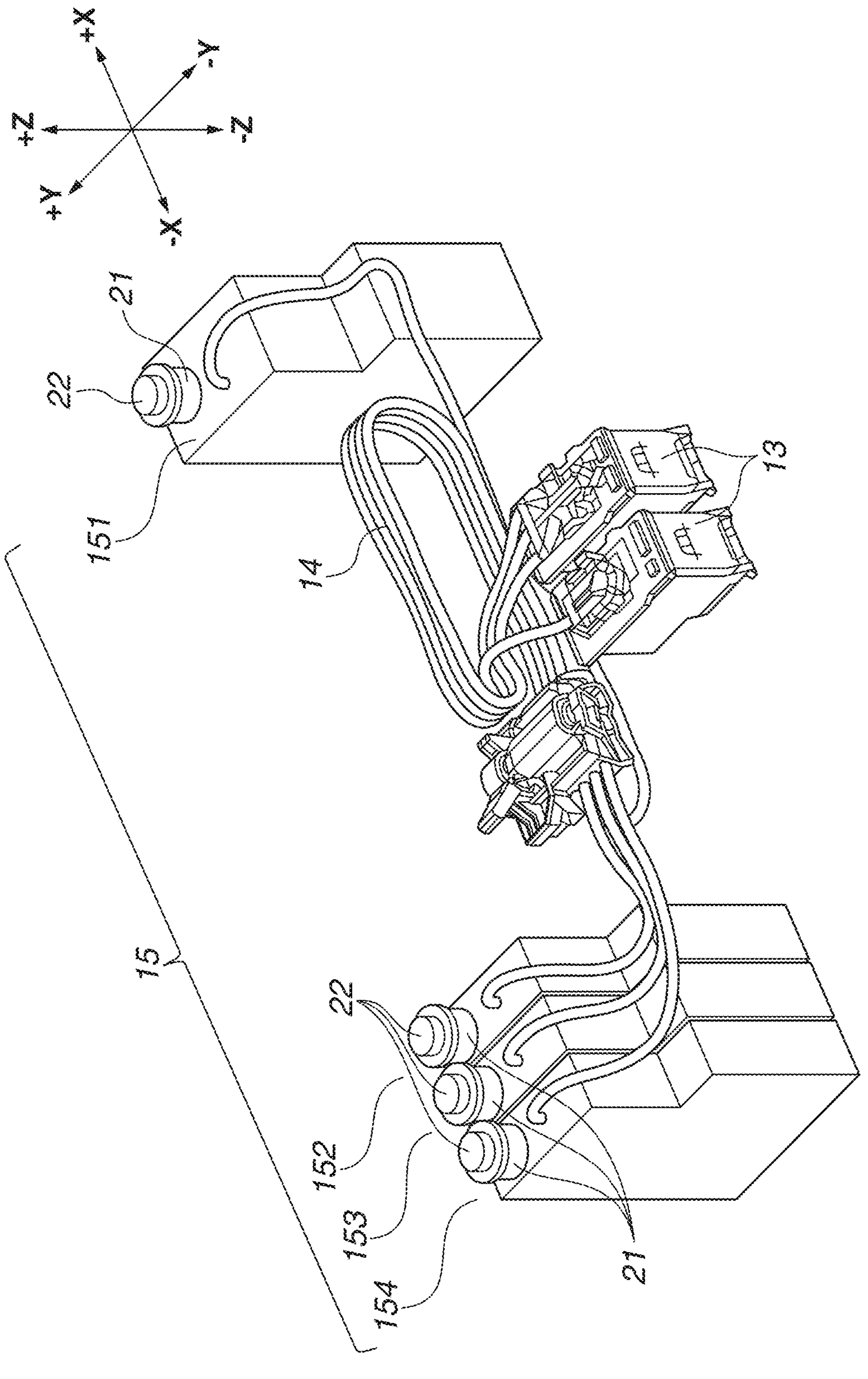
FIG. 2 is a schematic view of ink supply paths in the inkjet recording apparatus.

FIG. 2 is a schematic view of ink supply paths. The ink tanks 15 are provided corresponding to the ink colors. The ink tanks 15 in the present exemplary embodiment include a black tank 151, a cyan tank 152, a magenta tank 153, and a yellow tank 154. An ink injection port 21 is opened at a top of each ink tank 15. The ink injection port 21 is sealed with a tank cap 22 except for the time of ink injection.

At the time of ink injection, the user removes the tank cap 22 and injects the ink from an ink injection container not illustrated into the corresponding ink tank 15 via the ink injection port 21. Each of the ink tanks 15 has an atmosphere communication part not illustrated, and the ink in the ink tank 15 communicates with the atmosphere via the atmosphere communication part.

The ink tanks 15 in the present exemplary embodiment are not limited to a type fixed to the apparatus body but can be of a cartridge type detachably attached to the apparatus body.

Figure 3:
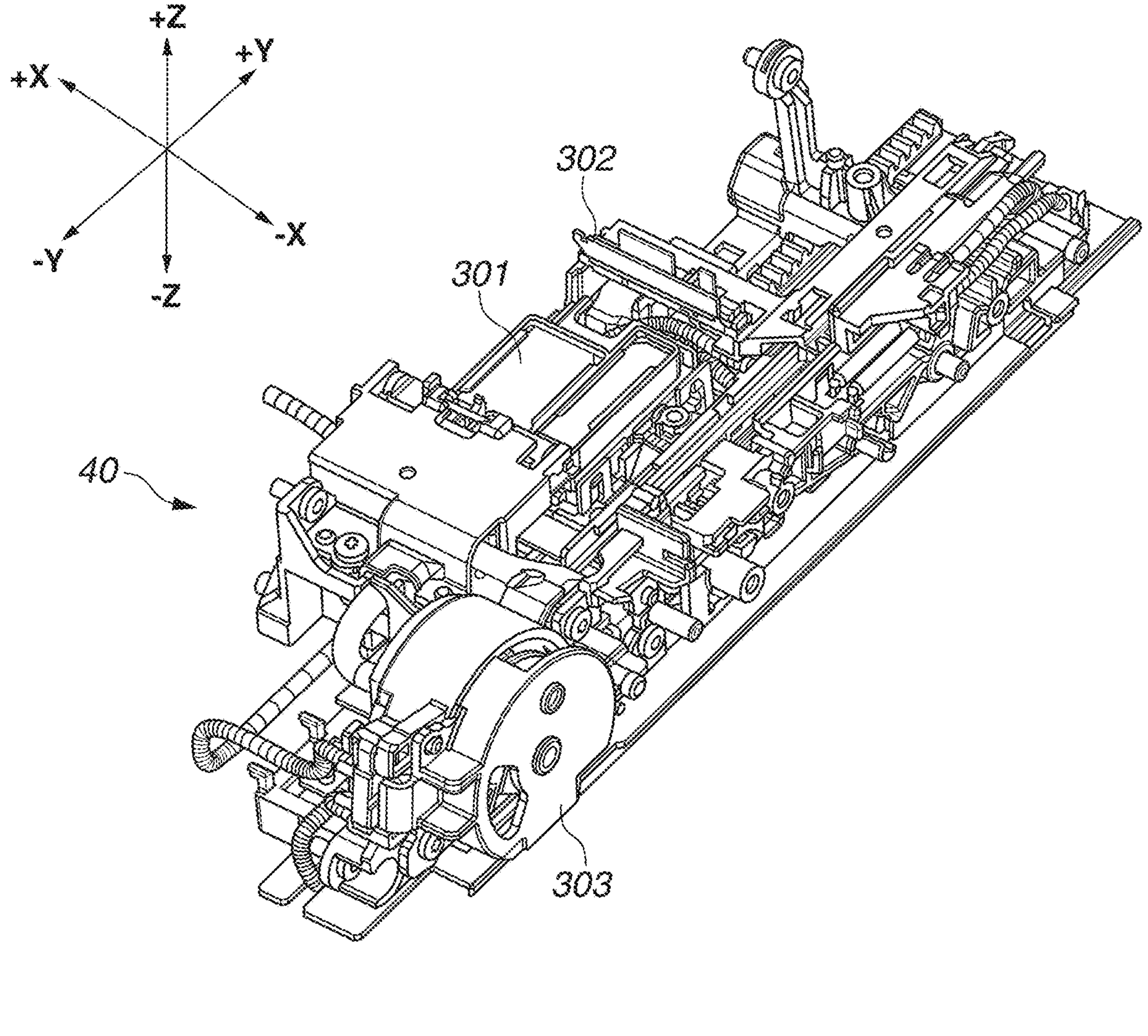
FIG. 3 is a three-dimensional perspective view of a recovery unit in the inkjet recording apparatus.

FIG. 3 is a three-dimensional perspective view of the maintenance unit 40. The maintenance unit 40 has a cap part 301 for capping the ink discharge portion 81 of the recording head 13. The maintenance unit 40 further includes a pump 303 for sucking the ink from the recording head 13 in a state where the cap part 301 caps the ink discharge portion 81, and a cleaning blade 302 for wiping dirt off the ink discharge portion 81.

The cap part 301 is formed of a flexible material and is movable to a capping position where the ink discharge portion 81 of the recording head 13 is covered and a separated position where the ink discharge portion 81 is not covered. The cap part 301 is connected to the pump 303. When the pump 303 is driven by a pump motor not illustrated in a state where the cap part 301 is at the capping position, negative pressure is generated inside of the cap part 301 so that the ink is sucked from the recording head 13. The cap part 301 and the pump 303 are connected each other via a cap tube, and the ink sucked from the recording head 13 by an ink suction operation is collected into a waste ink tank not illustrated.

Figure 4A:
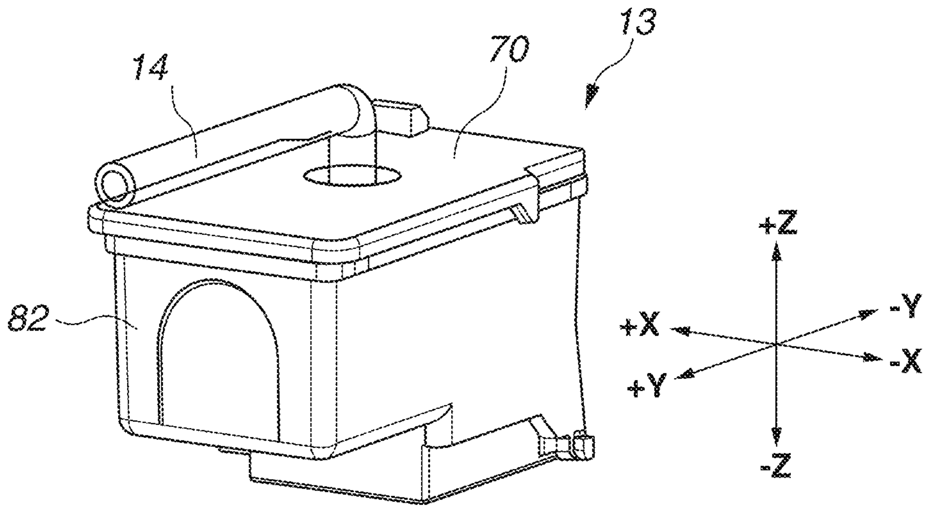
FIG. 4A is an external perspective view of a recording head and its peripheral components in a first exemplary embodiment.
Figure 4B:
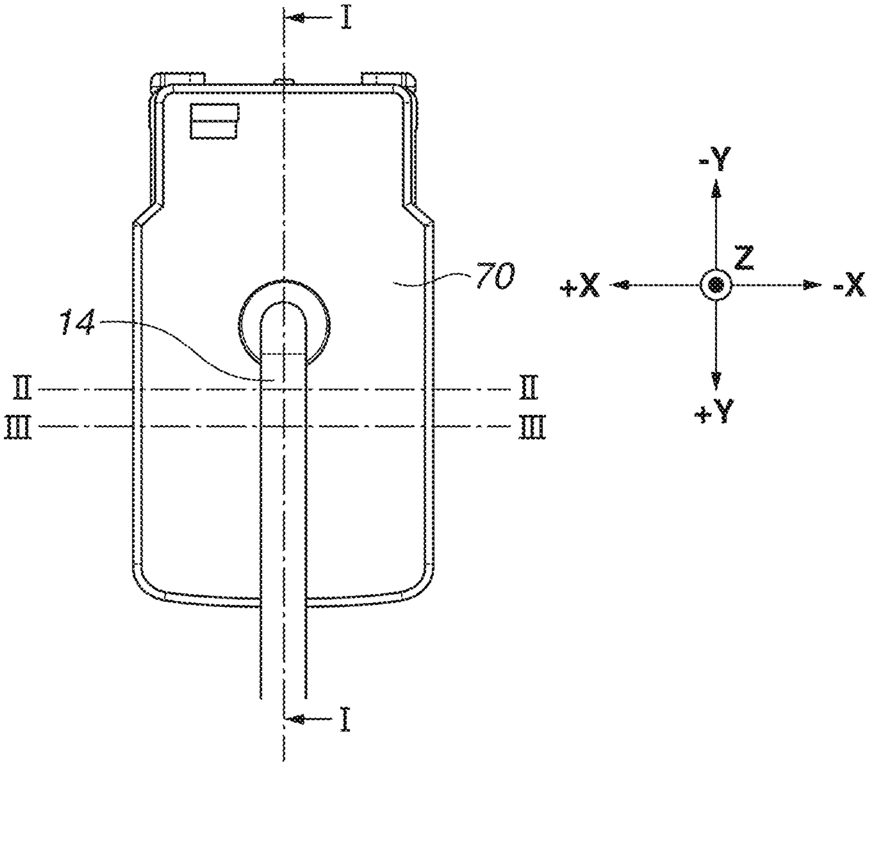
FIG. 4B is an external view of the recording head in the first exemplary embodiment as viewed from above in a Z direction.

FIG. 4A is an external perspective view of the recording head 13 and its peripheral components, and FIG. 4B is an external top view of the recording head 13 viewed from above in a Z direction (direction of a gravitational force). The recording head 13 is surrounded by a case 82 and a lid member 70.

Figure 5:
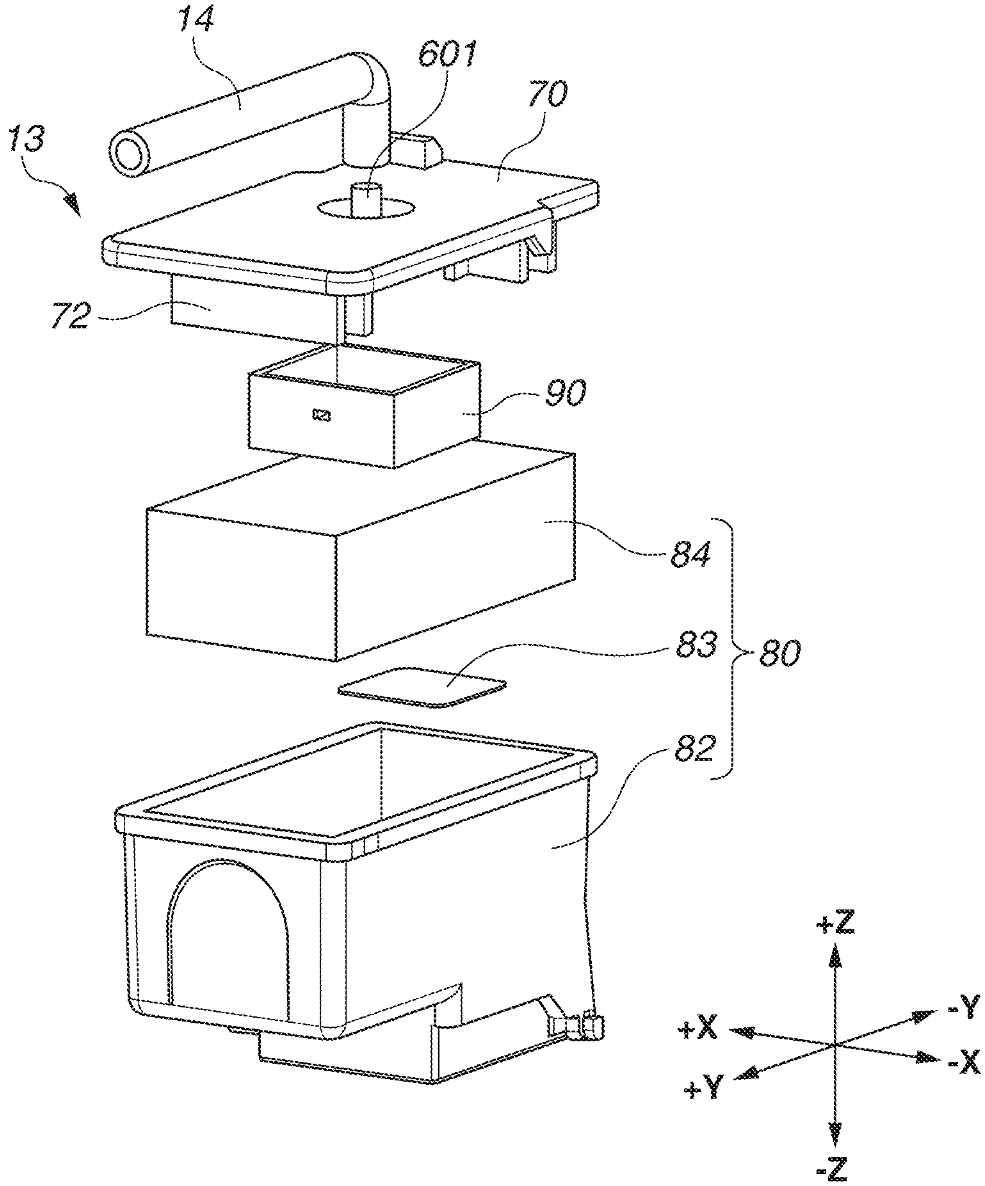
FIG. 5 is an exploded perspective view of the recording head in the first exemplary embodiment.

FIG. 5 is an exploded perspective view of the recording head 13. The lid member 70 of the recording head 13 connects to the ink supply path 14 at an ink supply path connection unit 601. The ink supply path connection unit 601 has an ink supply port 71 (see FIG. 6) that is opened inward of the case 82. The lid member 70 is provided with a pressing rib 72 that protrudes in a direction facing the case 82.

The case 82 is provided with the ink discharge portion 81 having a plurality of discharge ports (see FIG. 6) as a recording unit that records an image. The case 82 is also provided with a filter 83 that suppresses entry of dust into the ink discharge portion 81 and an ink holding member 84 that is a holding unit for holding the ink (liquid). The ink holding member 84 can be a fiber absorbent body, for example. In addition, the case 82 is provided therein with an ink buffer 90, which is a second reservoir unit where the ink supplied from the ink supply port 71 is reserved. In the present exemplary embodiment, the case 82, the filter 83, and the ink holding member 84 will be collectively called a liquid storage portion 80.

The ink holding member 84 and the filter 83 are desirably kept in a state of being pressed in contact with each other within the case 82. For this end, the pressing rib 72 is arranged on a back side of the lid member 70 to press the ink holding member 84 in a direction toward the filter 83. The lid member 70 is welded and attached to the case 82 in a state where the filter 83 and the ink holding member 84 are housed in the case 82. At this time, the pressing rib 72 presses the ink holding member 84. Accordingly, the ink holding member 84 and the filter 83 are pressed in contact with each other.

Figure 6:
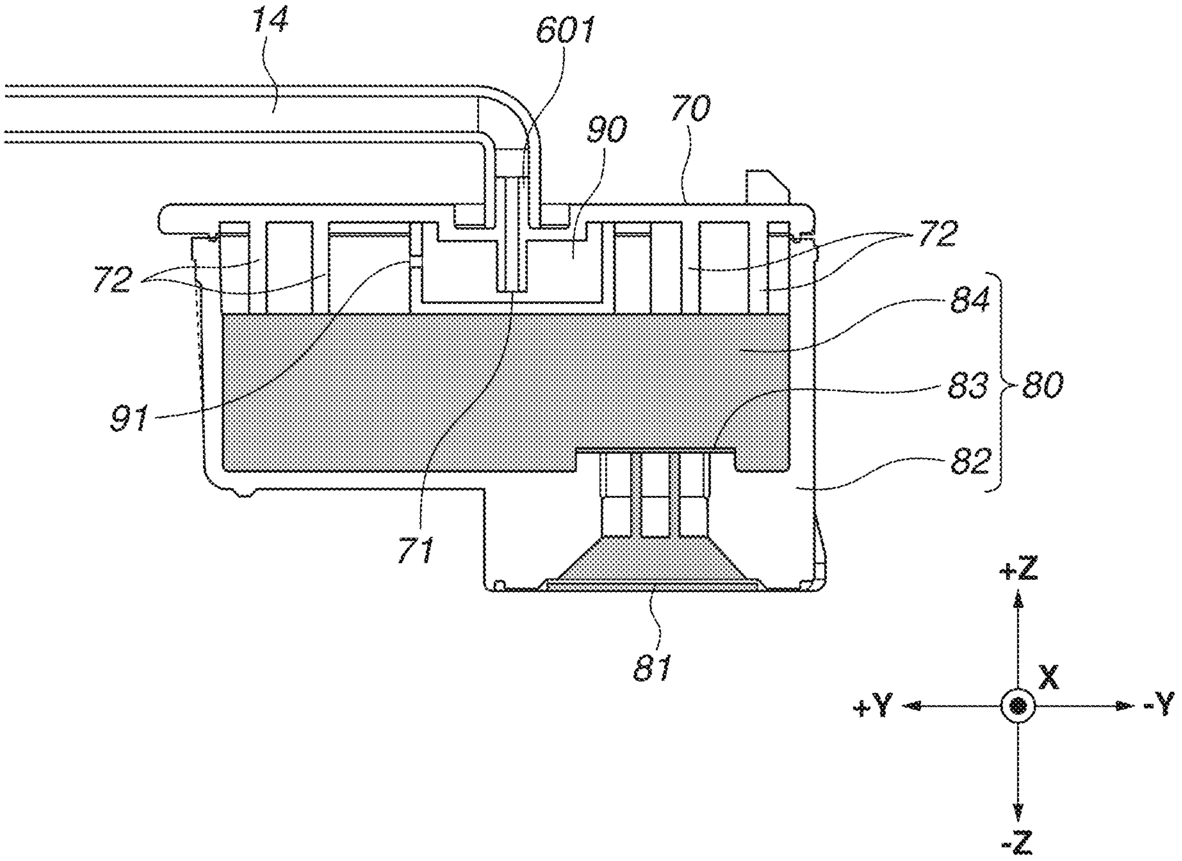
FIG. 6 is a cross-sectional view of the recording head (in an initial state before initial filling by a user) in the first exemplary embodiment, taken along a line I-I illustrated in FIG. 4B and viewed from a −X direction.

FIG. 6 is a cross-sectional view of the recording head 13 in an initial state before initial filling, taken along a line I-I illustrated in FIG. 4B and viewed from a −X direction. The initial filling here refers to initially filling the ink from the ink tank 15 to the ink supply path 14 and the recording head 13. In the recording head 13 of the present exemplary embodiment, the ink holding member 84 is filled with ink and held in this state even before the initial filling.

The ink discharge portion 81 of the recording head 13 is arranged at a position higher than a gas-liquid exchange portion where the ink reserved in the ink tank 15 and the atmosphere face each other, as seen in the Z direction. Accordingly, the negative pressure is generated in the ink discharge portion 81 due to a water head difference, which is a difference in height from the gas-liquid exchange portion in the ink tank 15. By the negative pressure, the ink is held in the ink discharge portion 81 and is suppressed from leaking out of the ink discharge portion 81. The present disclosure is not limited to the configuration of the recording head 13 and the ink tanks 15 using a water head difference but is also applicable to a configuration in which a negative pressure generation mechanism is provided in the ink tank 15.

The ink buffer 90 is placed in a space between the ink supply port 71 and a top surface of the ink holding member 84 regulated in position by the pressing rib 72. In the present exemplary embodiment, the ink buffer 90 is provided in the form of a container arranged immediately under the ink supply port 71 to temporarily reserve the ink supplied from the ink supply port 71. The ink buffer 90 has an opening 91 at a side surface portion, so that the ink having supplied from the ink supply port 71 and temporarily reserved is supplied to the ink holding member 84 through the opening 91. The opening 91 is formed at a position higher than a lower end of the ink supply port 71 as seen in the Z direction.

Figure 7A:
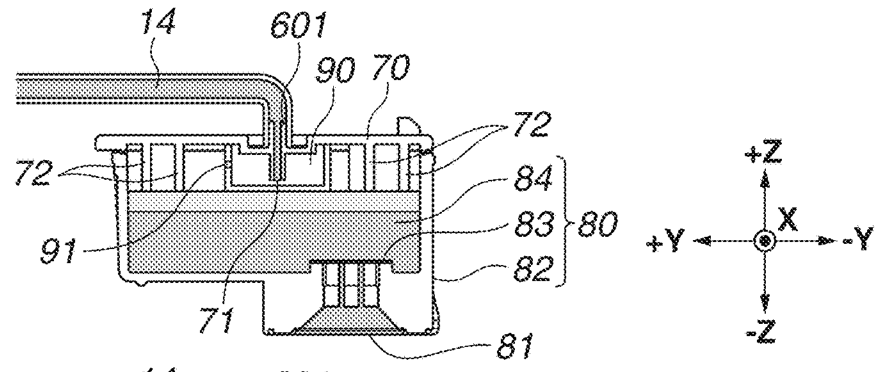
FIG. 7A is a schematic view of inside of the recording head in which ink has reached an ink supply port at the time of initial filling in the recording apparatus in the first exemplary embodiment.

FIGS. 7A to 7E are, like FIG. 6, cross-sectional views of the recording head 13 taken along the line I-I in FIG. 4B and viewed from the −X direction. FIG. 7A is a schematic view of inside of the recording head 13 during the initial filling in the recording apparatus 1. At this time, the ink supplied from the ink tank 15 via the ink supply path 14 reaches the ink supply port 71.

At the time of initial filling of ink into the recording head 13, the ink discharge portion 81 is sealed with the cap part 301 arranged in the maintenance unit 40. Thereafter, the ink is sucked by the pump 303 connected to the cap part 301 so that the negative pressure is generated inside of the cap part 301. As the sucking by the pump 303 is continuously repeated, the inside of the ink supply path 14 filled with the air before the initial filling will be filled with the ink up to the ink supply port 71.

Even in a state before the initial filling, the recording head 13 may hold a larger amount of ink than the volume of the ink supply path 14. In such a case, the ink can be supplied to the ink supply port 71 simply by discharging the ink from the ink discharge portion 81 without performing the ink sucking by the pump 303 described above.

After the ink has reached the ink supply port 71, as the ink sucking operation by the pump 303 and the ink discharge operation is continuously repeated, the negative pressure is generated inside of the liquid storage portion 80 according to the amount of ink discharged from the ink discharge portion 81. By the negative pressure, an ink meniscus formed at the ink supply port 71 is broken and the ink droplets drop into the ink buffer 90.

Figure 7B:
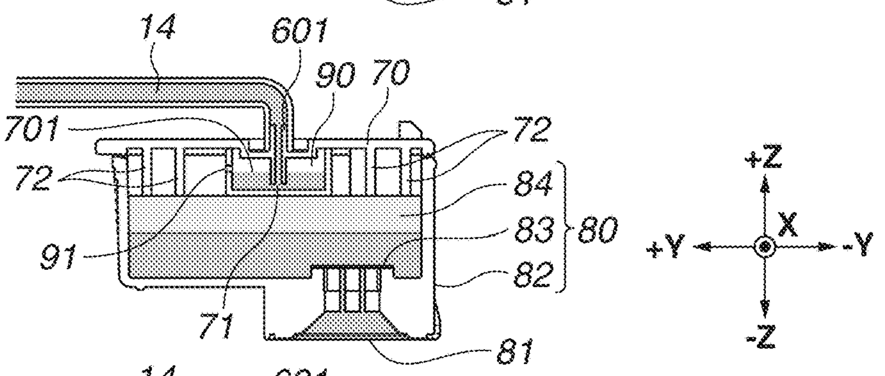
FIG. 7B is a schematic view of inside of the recording head at the time of completion of the initial filling into the recording head in the first exemplary embodiment.

FIG. 7B is a schematic view of inside of the recording head 13 at the time of completion of the initial filling into the recording apparatus 1. At this time, an ink liquid surface 701 of the ink reserved in the ink buffer 90 reaches the opening 91. When the ink is reserved up to this state, the initial filling is completed.

Figure 7C:
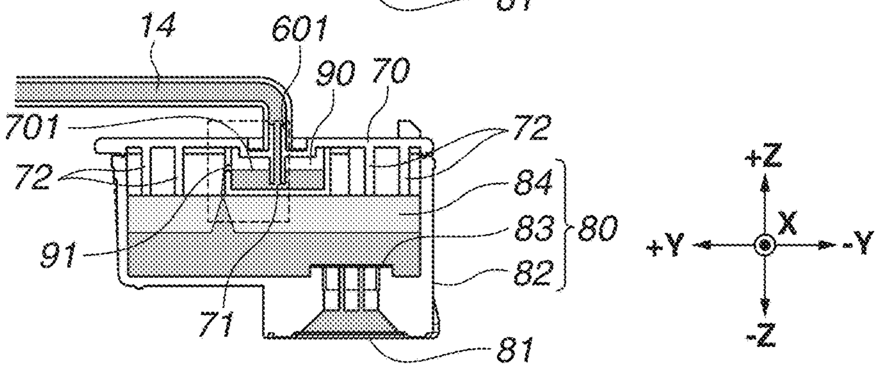
FIG. 7C is a schematic diagram illustrating ink supply from an ink buffer to an ink holding unit in the recording head after the completion of the initial filling in the recording apparatus in the first exemplary embodiment.
Figure 7D:
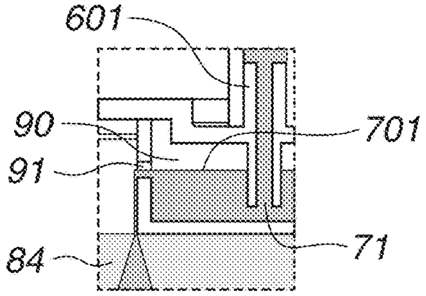
FIG. 7D is an enlarged view of a section inside a dashed line illustrated in FIG. 7C.

FIG. 7C is a schematic diagram illustrating ink supply from the ink buffer 90 to the ink holding member 84 in the recording head 13 after the completion of the initial filling of the recording apparatus 1. FIG. 7D is an enlarged view of the ink liquid surface 701 and the opening 91 in the ink buffer 90 in FIG. 7C (a section inside a dashed line). When the ink is discharged from the ink discharge portion 81, the same amount of ink as the amount of discharged ink moves from the ink holding member 84 to the ink discharge portion 81 via the filter 83 to generate the negative pressure in the ink holding member 84. This negative pressure raises the ink liquid surface 701 in the ink buffer 90.

When the raised ink liquid surface 701 exceeds the height of the opening 91, the ink flows out of the ink buffer 90 via the opening 91 and is absorbed by the ink holding member 84. When the ink liquid surface 701 in the ink buffer 90 is raised, the same amount of ink as the raised volume of ink is supplied from the ink tank 15 to the ink buffer 90 via the ink supply path 14. By repeating this operation, the ink in the ink tank 15 is continuously supplied to the recording head 13 via the ink supply path 14.

The operation of ink supply from the ink buffer 90 to the ink holding member 84 is performed even during the recording operation of the recording apparatus 1. At this time, the ink supply port 71 is downward in the Z direction with respect to the ink liquid surface 701 (downward in the direction of the gravitational force with respect to the ink liquid surface 701).

Figure 7E:
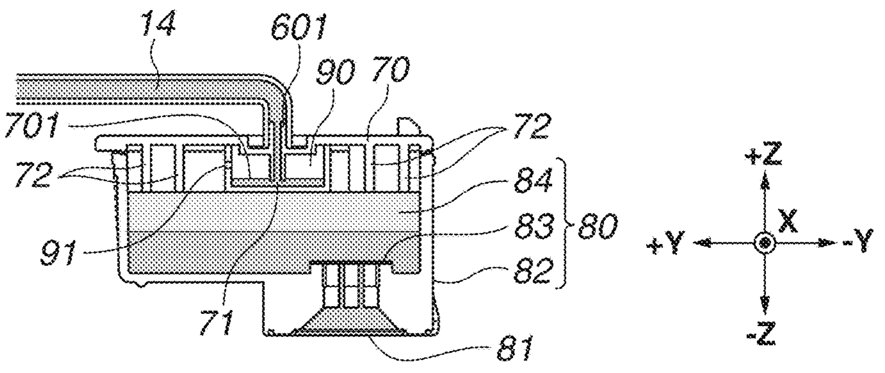
FIG. 7E is a schematic view of the recording head with a change in a surrounding environment of the recording apparatus after the completion of the initial filling in the recording apparatus in the first exemplary embodiment.

FIG. 7E is a schematic view of the recording head 13 with a change in a surrounding environment of the recording apparatus 1 from the state of the completion of the initial filling of the recording apparatus (equilibrium state) illustrated in FIG. 7C. If there occurs a temperature rise or an atmospheric pressure drop around the recording apparatus 1, the volume of the air in the recording head 13 expands according to the amount of change.

An upstream side of the ink supply path 14 communicates with the atmosphere via the ink tank 15, and a downstream side of the ink supply path 14 is in contact with the atmosphere via the ink discharge portion 81. When the air in the recording head 13 expands due to a temperature rise or an atmospheric pressure drop, the pressure inside the recording head 13 increases. Since the discharge port of the ink discharge portion 81 is extremely small in diameter, withstanding pressure of the meniscus at the discharge port is very high. In a case where the pressure inside the recording head 13 becomes higher than the withstanding pressure of the meniscus at the discharge port of the ink discharge portion 81, the meniscus becomes broken. On the other hand, in a case where the pressure inside the recording head 13 is equal to or less than the withstanding pressure of the meniscus at the discharge port of the ink discharge portion 81, the ink liquid surface 701 in the ink buffer 90 is pressed downward by the air expanding in the recording head 13.

In the present exemplary embodiment, the opening 91 in the ink buffer 90 is formed at a position higher than the lower end of the ink supply port 71 in the Z direction. Thus, in a case where the air in the liquid storage portion 80 expands, the air does not enter the ink supply path 14 until the ink liquid surface 701 becomes under the lower end of the ink supply port 71. Therefore, the ink supply port 71 is desirably provided downward in the Z direction as much as possible with respect to the opening 91.

Figure 8A:
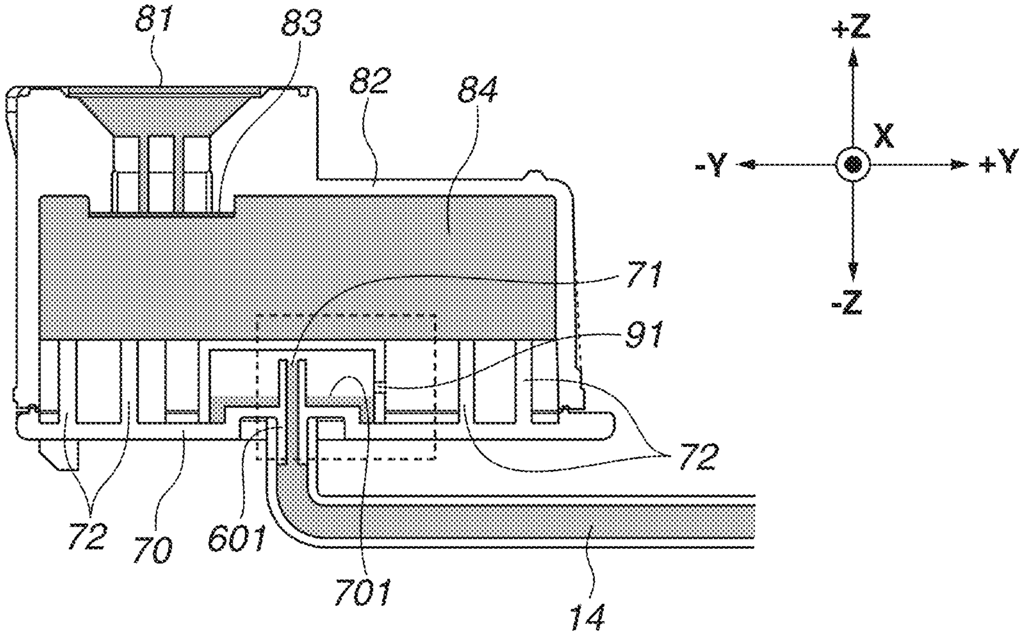
FIG. 8A is a schematic view of the recording head taken along the line I-I and viewed from the −X direction in a case where the recording apparatus in the first exemplary embodiment is placed upside down.
Figure 8B:
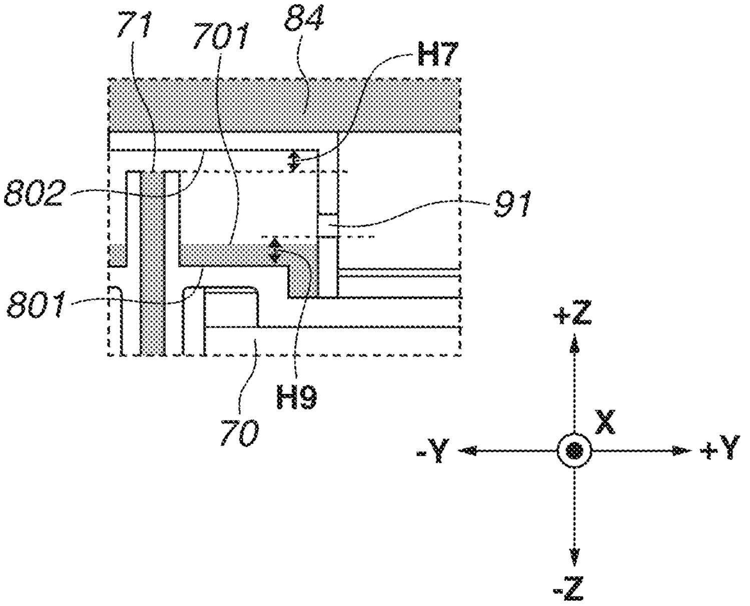
FIG. 8B is an enlarged view of a section inside a dashed line illustrated in FIG. 8A.

FIG. 8A is a schematic view of the recording head 13 taken along the line I-I in FIG. 4B and viewed from the −X direction in a case where the recording apparatus 1 is placed upside down. FIG. 8B is an enlarged view of a section inside a dashed line in FIG. 8A. When the recording apparatus 1 is moved or is unused, the recording apparatus 1 may be left upside down. In this case, the ink liquid surface 701 in the ink buffer 90 moves downward in the Z direction by gravity.

As illustrated in FIG. 8B, a distance from a surface 801 (top surface) in the ink buffer 90 to the opening 91 is designated as H9 and a distance from the lower end of the ink supply port 71 to a surface 802 (bottom surface) in the ink buffer 90 is designated as H7. In this case, H9 is set to be longer than H7. Accordingly, even if the recording apparatus 1 is placed upside down, the ink reserved in the ink buffer 90 does not flow out of the opening 91 toward an air layer so that a constant amount of ink is held in the ink buffer 90.

Thus, when the recording apparatus 1 is re-installed in a posture for performing the recording operation as illustrated in FIG. 1, the ink liquid surface 701 can be returned to the state of being reserved on the surface 802 (bottom surface) facing the ink holding member 84 in the ink buffer 90 as illustrated in FIG. 7B. At this time, the ink liquid surface 701 comes above the ink supply port 71, so that it is possible to prevent the air from entering into the ink supply path 14 via the ink supply port 71.

Figure 9:
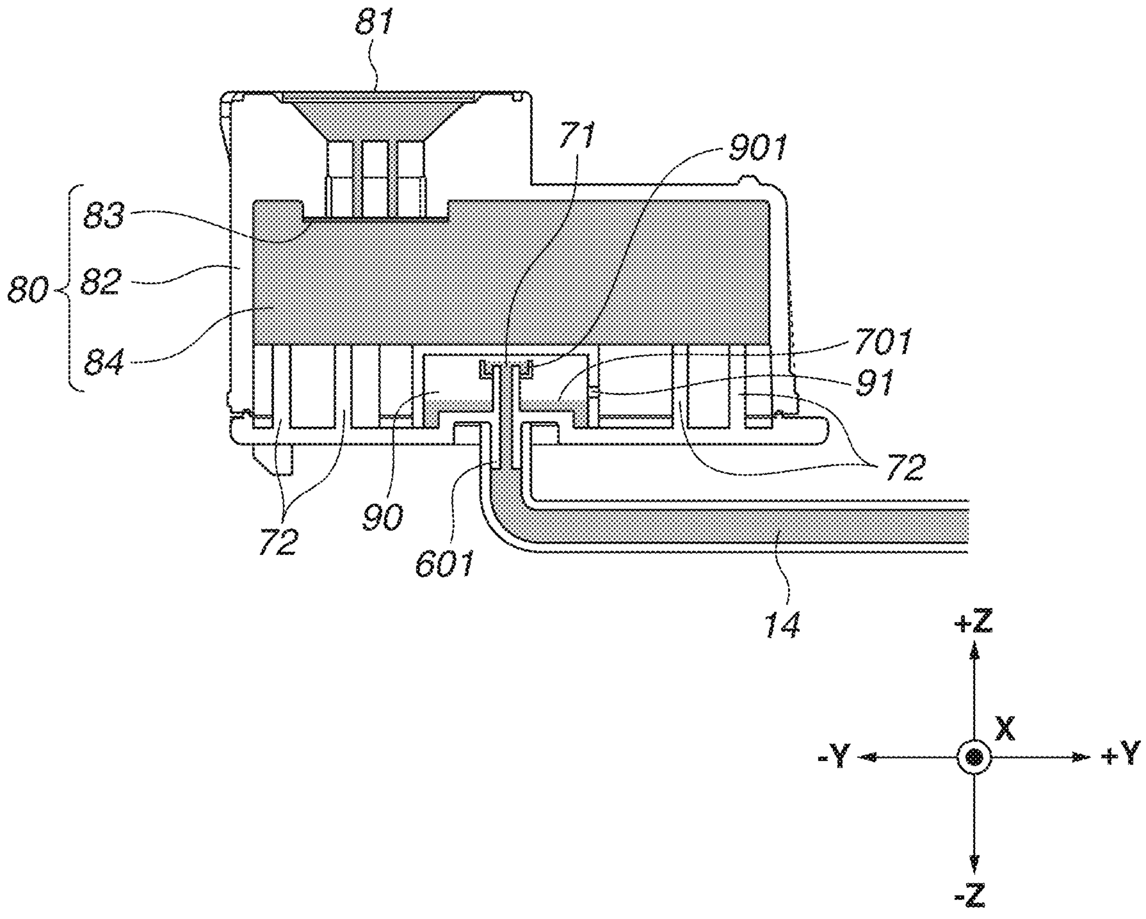
FIG. 9 is a schematic view of a recording head in a modification example where a liquid retaining unit is provided around the ink supply port in the first exemplary embodiment.

FIG. 9 is a schematic cross-sectional view of a recording head 13 in a modification example where a liquid retaining unit is provided around an ink supply port 71, in a state where a recording apparatus 1 is placed upside down. While the recording apparatus 1 is left upside down, in a case where the air in the recording head 13 expands due to an atmospheric pressure drop or a temperature rise, the air may enter into the ink supply path 14 through the ink supply port 71.

Providing an ink retaining unit 901 (liquid retaining unit) around the ink supply port 71 makes it possible to, even if the recording apparatus 1 is left upside down, retain the ink in the ink retaining unit 901. This more reliably prevents the entry of the air into the ink supply path 14 even in the case of expansion of the air in the recording head 13.

In the present modification, when the recording apparatus 1 is placed upside down, a liquid surface of the ink retained in the ink retaining unit 901 comes upward in the Z-axis direction with respect to the ink supply port 71.

A leading end of the ink retaining unit 901 is located upward in the Z direction (the direction of the gravitational force) with respect to the ink supply port 71, in a case where the recording apparatus 1 is placed upside down.

Figure 10:
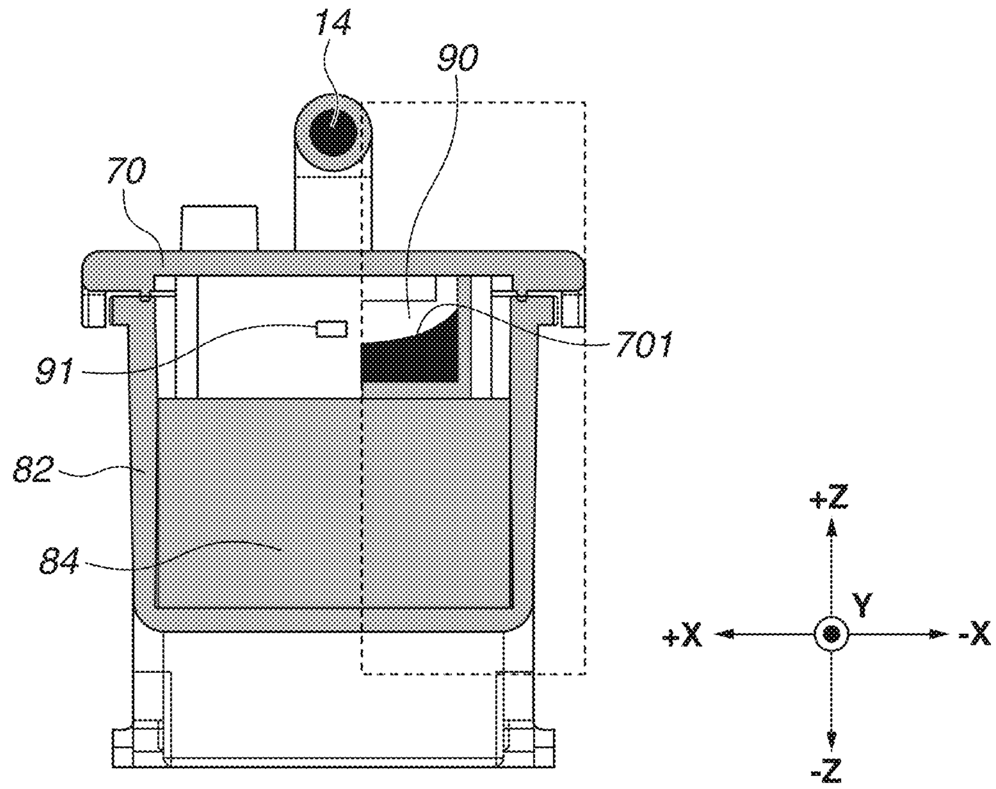
FIG. 10 is a cross-sectional view of the recording head taken along a line II-II and a line III-III, both of which are illustrated in FIG. 4B, and viewed from a +Y direction, in a case where a carriage performs a reversal operation in the first exemplary embodiment.

FIG. 10 is a cross-sectional view of the recording head 13 taken along a line II-II and a line III-III in FIG. 4B and viewed from a +Y direction, in a case where the carriage 30 performs a reversal operation. A section inside a dashed line in FIG. 10 corresponds to the cross-sectional view taken along the II-II line in FIG. 4B, and a section outside the dashed line corresponds to the cross-sectional view taken along the III-III line in FIG. 4B. During the recording operation of the recording apparatus 1, the carriage 30 performs scanning in the X direction of FIG. 1, but may perform the reversal operation to reverse the scanning direction. FIG. 10 illustrates a state in the recording head 13 immediately before the reversal operation of reversing the scanning direction to the +X direction after the movement of the carriage 30 toward the maintenance unit 40 in the –X direction.

During the recording operation of the recording apparatus 1, the movement of the carriage 30 causes an X-direction inertial force to act on the ink in the ink buffer 90 to move the ink. For example, immediately before the reversal operation of the carriage 30 after the movement toward the maintenance unit 40, a –X inertial force acts on the ink in the ink buffer 90. Thus, the ink liquid surface 701 moves in such a manner to incline to the –X direction in the ink buffer 90. At this time, if the opening 91 is opened at a position displaced from the center to the –X direction, the ink moved in the ink buffer 90 may flow out of the opening 91 and be supplied to the ink holding member 84. In addition, the ink moved in the ink buffer 90 may become scattered via the opening 91 to various areas in the recording head 13 to make unstable the ink supply to the ink holding member 84.

Thus, the opening 91 in the ink buffer 90 is desirably opened to a direction crossing the X direction that is the scanning direction of the carriage 30. In the present exemplary embodiment, among side surfaces of the ink buffer 90, the opening 91 is desirably opened in a side surface along an XZ plane. Further, in the present exemplary embodiment, the opening 91 is desirably opened in the vicinity of the center in the X direction of the side surface along the XZ plane.

According to this configuration, it is possible to, even if the ink moves by the X-direction inertial force due to the movement of the carriage 30, reduce fluctuation in the ink supply resulting from fluctuation in the height of the ink liquid surface 701. This suppresses overflow of the ink from the ink buffer 90 due to scanning by the carriage 30, thereby allowing stable ink supply to the ink holding member 84.

A second exemplary embodiment will be described below. Description of components similar to those in the first exemplary embodiment described above will be omitted.

Figure 11:
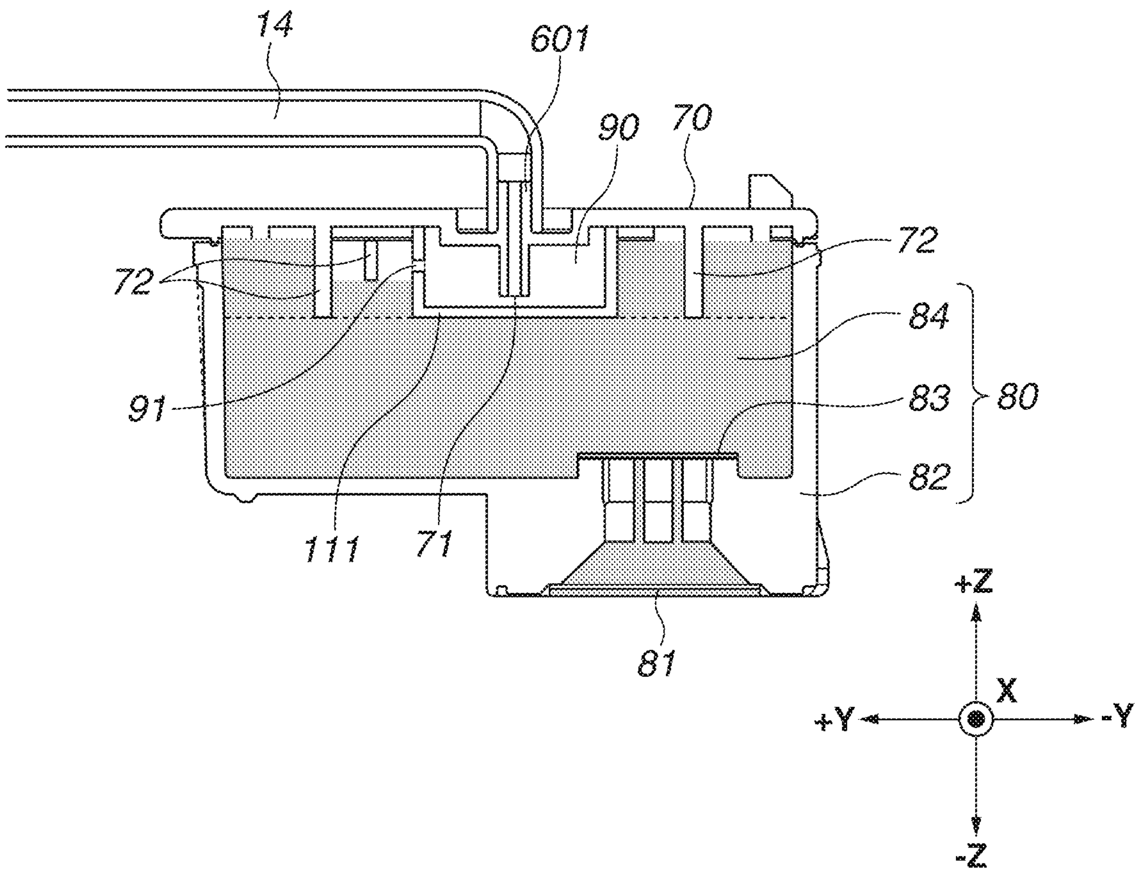
FIG. 11 is a schematic cross-sectional view of a recording head in a second exemplary embodiment.

FIG. 11 is a schematic cross-sectional view of a recording head 13 in a second exemplary embodiment. In the present exemplary embodiment, an ink holding member 84 is arranged upward in a Z direction with respect to a bottom surface 111 of an ink buffer 90. The ink holding member 84 in the vicinity of an opening 91 is regulated by pressing ribs 72 so as not to block the opening 91 on a side surface of the ink buffer 90. The pressing ribs 72 in the vicinity of the opening 91 can be made shorter in the Z direction than the pressing ribs 72 at a position not in the vicinity of the opening 91. As far as ink in the ink buffer 90 can be supplied from the opening 91, the ink holding member 84 can be arranged in the vicinity of the opening 91 such that the opening 91 is covered with the ink holding member 84.

In the event of a temperature rise or an atmospheric pressure drop around a recording apparatus 1, the air in the recording head 13 expands according to the amount of change. Thus, as the proportion of an air layer in a liquid storage portion 80 is greater, the drop of a liquid surface of the ink in the ink buffer 90 is more affected by the expansion of the volume of an air layer portion. Thus, the proportion of the volume of the air layer in the recording head 13 is desirably small enough in comparison to the proportion of the volume of the ink holding member 84. Therefore, increasing the volume of the ink holding member 84 as in the present exemplary embodiment reduces the effect of the expansion of the volume of the air layer portion on the drop of an ink liquid surface 701 in the ink buffer 90.

In either the first exemplary embodiment or the second exemplary embodiment, the advantageous effects of the present disclosure can be obtained even if the ink holding member 84 is arranged upward in the Z-axis direction with respect to a top surface of the ink buffer 90.

The recording head 13 in the present disclosure can be a long line head in which discharge ports are arranged in an area corresponding to a width of a recording medium.

According to the present disclosure, it is possible to provide a recording apparatus that, even if the air in a recording head expands due to a temperature change or an atmospheric pressure change, suppresses the air from entering into a supply path.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2021-091749, filed May 31, 2021, which is hereby incorporated by reference herein in its entirety.

What is claimed is:

1. A recording apparatus comprising:

a recording head configured to discharge a liquid and record an image;

a first liquid reservoir unit configured to store the liquid to be supplied to the recording head;

a liquid supply port configured to supply the liquid stored in the first liquid reservoir unit into the recording head;

a liquid supply path connecting the first liquid reservoir unit and the liquid supply port;

a second reservoir unit, disposed in the recording head, configured to store the liquid supplied from the liquid supply port; and a holding unit configured to hold the liquid supplied from the second reservoir unit, in the recording head, wherein the second reservoir unit includes an opening that is provided upward in a direction of a gravitational force with respect to the liquid supply port and is configured to supply the liquid to the holding unit, in a case where the recording head is in a posture of performing recording.

2. The recording apparatus according to claim 1, further comprising a liquid retaining unit provided around the liquid supply port.

3. The recording apparatus according to claim 1, wherein the liquid supply port is provided downward in the direction of the gravitational force with respect to a surface of the liquid stored in the second reservoir unit, in the case where the recording head is in the posture of performing recording.

4. The recording apparatus according to claim 1, wherein a distance from a top surface of the second reservoir unit to the opening is greater than a distance from a bottom surface of the second reservoir unit to the opening.

5. The recording apparatus according to claim 1, wherein the recording head reciprocates in a first direction during an operation of recording an image.

6. The recording apparatus according to claim 5, wherein the opening is provided on a side surface of the second reservoir unit.

7. The recording apparatus according to claim 6, wherein the opening is provided in a center portion in the first direction of the side surface.

8. The recording apparatus according to claim 5, wherein the opening is opened toward a direction crossing the first direction.

9. A recording head comprising:

a liquid supply port into which a liquid is supplied from a first liquid reservoir unit configured to store the liquid via a liquid supply path;

a second reservoir unit configured to store the liquid supplied from the liquid supply port; and a holding unit configured to hold the liquid supplied from the second reservoir unit, wherein the second reservoir unit includes an opening that is provided upward in a direction of a gravitational force with respect to the liquid supply port and is configured to supply the liquid to the holding unit, in a case of being in a posture of performing recording.

10. The recording head according to claim 9, further comprising a liquid retaining unit provided around the liquid supply port.

11. The recording head according to claim 9, wherein the liquid supply port is provided downward in the direction of the gravitational force with respect to a surface of the liquid stored in the second reservoir unit, in the case of being in the posture of performing recording.

12. The recording head according to claim 9, wherein a distance from a top surface of the second reservoir unit to the opening is greater than a distance from a bottom surface of the second reservoir unit to the opening.

13. The recording head according to claim 9, further comprising a discharge port configured to discharge the liquid, wherein the recording head reciprocates in a first direction at a time of discharging the liquid from the discharge port.

14. The recording head according to claim 13, wherein the opening is provided on a side surface of the second reservoir unit.

15. The recording head according to claim 14, wherein the opening is provided in a center portion in the first direction of the side surface.

16. The recording head according to claim 13, wherein the opening is opened toward a direction crossing the first direction.

* * * * *